Patented May 13, 1941

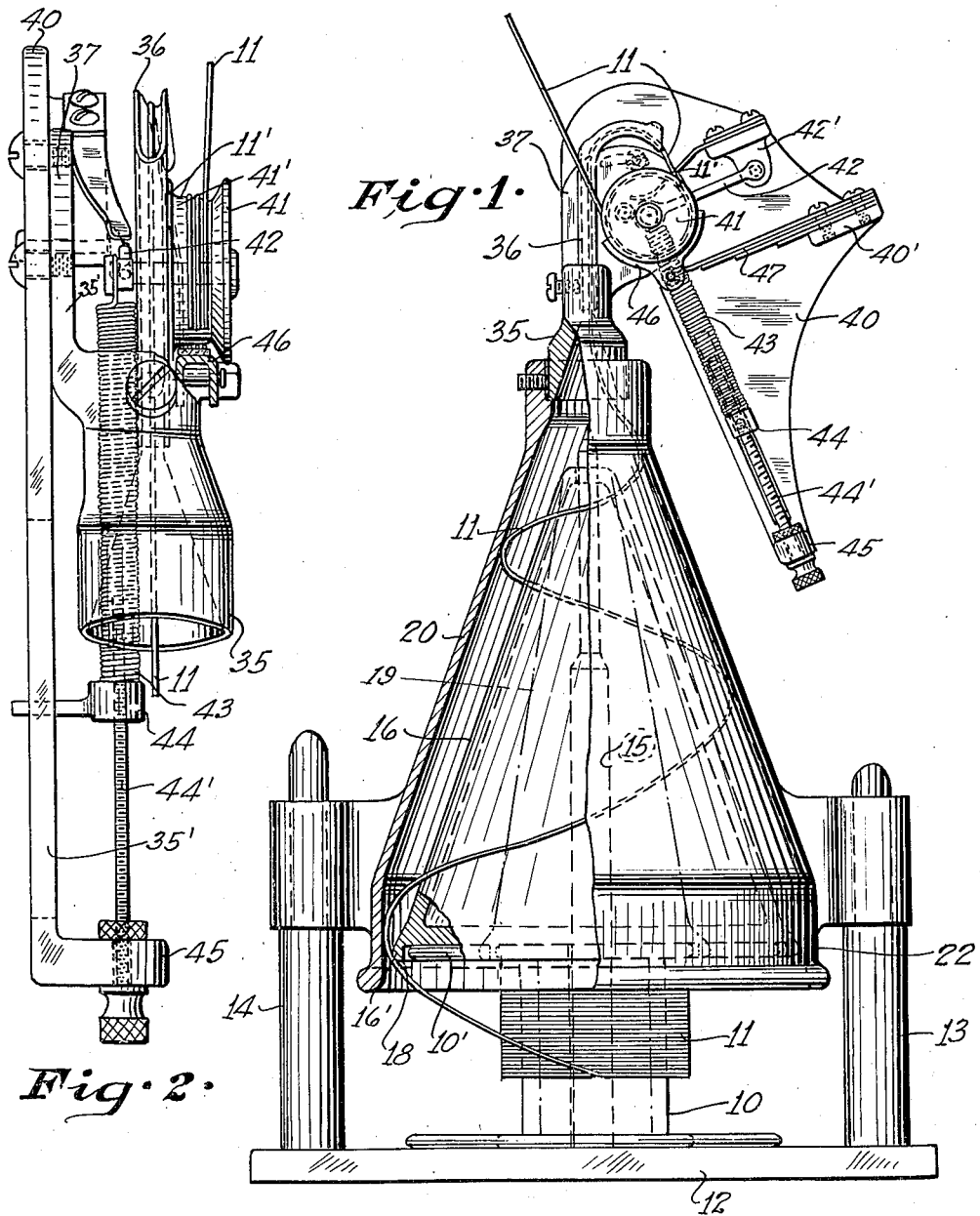

2,242,053

UNITED STATES PATENT OFFICE 2,242,053

WIRE DESPOOLING DEVICE

Penrose E. Chapman, Sr., St. Louis, Mo.

Application October 1, 1938, Serial No. 232,715

1 Claim. (Cl. 242—128)

This invention may be considered as a step forward from my Patent No. 1,682,213 and Patent No. 1,081,716 by Wilfred Boulais owned by me.

The object of my invention is the despooling of wire, without injury, kinking, or snarling, smoothing out of the inevitable variations in tension on said wire, and the applying of automatically compensated tension to said wire so that the final or delivered tension shall be practically uniform.

Further objects are despooling oversize spools, extremely quick starting, stopping, and tremendous running speeds. Another object is to feed the wire in any reasonable direction from the device. Simplicity is always an object.

I accomplish these objects as hereinafter described.

The term "spool" is herein used to include spools small or large, the latter frequently being called reels.

The term "wire" is herein used to include any elongated material as cordage, wire, ribbon, et cetera, made of any material.

In the drawing

Fig. 1 is a general front elevation showing complete assembly partly in section. Small spool shown in dot and dash.

Fig. 2 is a left edge detail elevation and section of the tension applying elements.

Briefly any suitable base 12 with supports as 13, 14, 15, carries a spool 10 with wire 11 and the elements of my invention.

A conical despooling cover 20 is supported over the spool as by said supports but free therefrom. The apex piece 35 of cover 20 may support both the wire directioning guide 36 and by means of the swivel 37 the tensioning elements 40 to 47.

Adjacent the head 10' of the spool 10 I place a cone 16 hereinafter called a spool cap. Said cap being supported in any convenient manner as by the spool 10 and/or a spindle 15. A similar but smaller spool cap 13 is shown in dot and dash.

Under some conditions, particularly when the spools are oversize, it is desirable to take the wire 11 off a spool 10 over the head or flange 10' of said spool. A number of difficulties and irregularities are encountered when attempting to do this, one of which is tensions varying from zero to enough to break the wire. When the speed of despooling becomes great centrifugal force caused by the wire swinging around the head or flange of the spool will cause the tension of the wire to vary as described. In my Patent No. 1,682,213 I have revealed one method of overcoming said contrifugal force that is quite effective when the speed of despooling is moderately fast. When the speed becomes still higher centrifugal force again manifests itself and causes loops or festoons, like the cables of a suspension bridge, to appear between the spool and retaining hoop and between hoop and hoop, causing the wire to be bent back and forth in its travel which stretches and hardens it and more or less injures the insulation. The more hoops the more bends and greater the injury. Also these festoons add to the tension to be dealt with.

In this invention I have overcome the difficulties enumerated in the previous paragraph together with those enumerated in my said patent and in addition simplified the device by placing over the end of the spool a conical cover 20. A sleeve or skirt 22 may be formed on its big end so as to more or less envelop the said spool.

The wire 11 passes over the head 10' of the spool thence through said cover 20 and out its apex 35. In operation, at slow speeds of despooling the wire 11 will more or less hug the spool head 10' of the spool and the cover 20, 22 and 35 will have a minor influence. When the speed of despooling becomes greater centrifugal force begins to appear; the wire leaves the flange of the spool and attempts to fly out and describe the largest possible circle. This action if not restrained will produce plenty of trouble.

I prevent said trouble as follows: As the wire leaves the spool it may first encounter the despooling cover skirt 22 which will restrain the centrifugal force generated in its flight around the spool and its flange. This skirt 22 is made sufficiently along that there is no appreciable festooning of the wire between the spool and itself. The wire will then pass into the conical portion 20 of the cover which gradually directs it toward the axis of its flight where centrifugal force is practically nil.

It is obvious that the said cover 22, 20, 35 will absorb said centrifugal force and deliver the wire free or almost free of centrifugal tension at its apex; and because the interior of the said cover is practically smooth and free from hoops, ribs, ridges, openings, and the like, the wire will be uninjured in its flight by festooning or abrasion.

Owing to the natural spiral in the wire, due to its being wound on the spool in a helix, to the one revolution twist imparted to the wire per turn on the spool, and, most vicious of all, the decided twisting action of the thread when the wire has a textile covering on it, the wire may not leave the spool in a straight line but in a spiral. After the wire leaves the spool mishaps are caused by this spiral-twisting action for it causes the wire to twist into loops, kinks, tangles and snarls which in turn cause breaks in the wire, short circuited coils, etc. I shall refer to such a group of mishaps as kink, or kinking, mishaps.

When this spiral-twisting action is mild the despooling cover 22, 20, 35 exerts sufficient damping action to prevent this kinking. When said spiral-twisting action is strong as it is in fine single thread covered wires then the despooling cover will exert insufficient damping action to prevent kinking, especially at slow and more especially at 0, speeds of despooling. For brevity I shall use the term "during despooling" to include said 0 speeds.

To prevent this kinking I apply some form of an arbor to the spool over or around which the wire may entwine itself as it leaves the spool. So simple an arbor as the mast 15 helps. I prefer however to enlarge this arbor into a cone as 16. I might now appropriately term it an anti kink despooling cap. For brevity I call it a spool cap.

The method of mounting said cap is optional. Placing the base 17 adjacent the spool head 10', sliding the small end over the mast 15 and using tip of said mast as the apex of the cone as shown in Fig. 1 is a convenient method. The base of this conical spool cap is at its best when it approximates the diameter of the spool head 10'. The exact shape and structure of the spool cap is not critical. I prefer solid surfaces although ribbed, hooped, perforated, latticed or other forms of surface work properly.

It is desirable but not necessary that the cap 16 and the cover 20 be concentric and of somewhat similar angles, and that the annular space between them be restricted. Down to a certain point the more restricted the space the better.

In operation when the wire 11 comes off the spool 10 in spirals the spool cap 16 will approximately fill the said spirals and prevent their twisting around into kinks. If the wire were otherwise unconfined it would at times form kinks in spite of said spool cap 16. The despooling cover 20 owing to its close juxtaposition to the spool cap now comes into play and the combined action of the cap, the cover and the restricted space between them, through which wire must pass, prevents kinking of the wire.

The above elements enable despooling at tremendous acceleration, running and deceleration rates and from oversize spools.

When the wire emerges from the above despooling elements momentary tension will occur, although much of the time it will be under insignificant tension.

All types of machine winding require a tension on the wire and some types of winding require a very uniform and critical tension. This dictates the use, in connection with my despooling elements, of a device to apply tension to the wire that will also be self-adjusting, like a governor, and compensate for the irregularities in tension as the wire comes off the spool and those caused by erratic demand, and which will therefore deliver the wire under practically uniform tension.

Such tensioning elements, or device as I shall call them, may be applied to the wire at any place between the despooling elements and the work. It however makes a more compact unit if they are closely associated with the despooling elements. It is also desirable that the wire be delivered in any reasonable direction.

To the latter end I prefer to revolvably attach the apex 35 of the despooling cover 20 thereto, thus providing a horizontal swivel. Said apex piece carries the arm 35' which in turn supports the frame 40 of the tension device by means of the vertical swivel 37, thus obviously providing for both horizontal and vertical adjustment in the direction of the wire delivery.

To provide the tension I movably mount a capstan pulley 41 upon a crank 42. The shaft of this crank is supported in the bearing 42' in the frame 40. The tread 41' of the capstan pulley may be of any conventional pattern but I prefer it tapered in the usual manner.

A brake shoe 46 is arranged to act against the tread of said capstan pulley. Said shoe is shown in section in Fig. 2. This brake shoe is flexibly mounted as by the brake shoe spring 47 that is conveniently attached to the lug 40' of the frame 40.

The capstan pulley 41 is pressed against said brake shoe 46 by the tension spring 43 which has one end attached to crank 42 and the other through any convenient adjusting means as nut 44 and screw 44' to the bracket 45 carried by the frame 40.

In action the wire 11 emerges from the apex 35 through the wire directing guide 36 and is deposited by it upon the high side of the capstan pulley tread at 11', then wraps around said pulley and leaves the lower side of the tread approximately in the direction of the motion of said pulley. With this arrangement the wire is gripped between the brake shoe 46 and the tread 41' of the capstan pulley as shown in section in Fig. 2 thus supplying the friction or drag necessary in applying a tension to said wire. As the wire 11 slips down the tread 41' of the capstan pulley in the usual manner it also slips across the face of the brake shoe and thereby avoids wearing serious grooves therein.

The automatic regulation or governing of the tension is accomplished as follows: As stated the capstan pulley is pressed against the brake shoe by the spring 43. The direction of the pull of the wire going to and leaving the pulley is opposed to the action of said spring upon said pulley so that as the tension on either or both the entering or leaving wire increases it tends to neutralize more or less the tension of said tension spring and retract or pull said pulley away from said brake shoe, thus easing off or releasing the braking action of the said brake shoe. When tension on wire decreases obviously the reverse action occurs.

There may be many modifications of the physical structure I have used to disclose this one of my inventions that may be used without departing from said invention. Therefore as my invention I wish to claim:

In a despooling device, the combination of a conical despooling cover with a conical spool cap, the base of said cap being shaped to match a spool head, means for supporting said cap adjacent said spool head, and means for supporting said cover over said spool head so as to leave a restricted space between the cap and cover through which wires from the spool may be drawn.

PENROSE E. CHAPMAN, Sr.